United States Patent
Wang et al.

(10) Patent No.: US 7,268,319 B2
(45) Date of Patent: Sep. 11, 2007

(54) METHOD OF METALLURGICALLY BONDING ARTICLES AND ARTICLE THEREFOR

(75) Inventors: Pei-Chung Wang, Troy, MI (US); Hai-Lung Tsai, Rolla, MO (US)

(73) Assignee: General Motors Corporation, Detroit, MI (US)

( * ) Notice: Subject to any disclaimer, the term of this patent is extended or adjusted under 35 U.S.C. 154(b) by 239 days.

(21) Appl. No.: 10/838,608

(22) Filed: May 4, 2004

(65) Prior Publication Data
US 2005/0247678 A1  Nov. 10, 2005

(51) Int. Cl.
*B23K 9/00* (2006.01)
(52) U.S. Cl. .............. 219/137 R; 219/117.1
(58) Field of Classification Search ........... 219/121.64, 219/165, 166, 167
See application file for complete search history.

(56) References Cited

U.S. PATENT DOCUMENTS

| | | | | |
|---|---|---|---|---|
| 3,597,574 A * | 8/1971 | Erlandson | ............ | 219/75 |
| 4,409,278 A * | 10/1983 | Jochym | ............ | 428/163 |
| 4,873,415 A | 10/1989 | Johnson et al. | ......... | 219/121.64 |
| 4,916,285 A | 4/1990 | Baur et al. | ............ | 219/121.72 |
| 4,996,113 A | 2/1991 | Hector et al. | ............ | 428/600 |
| 5,025,547 A | 6/1991 | Sheu et al. | ............ | 29/527.4 |
| 5,250,364 A | 10/1993 | Hector, Jr. et al. | ......... | 428/687 |
| 5,508,119 A | 4/1996 | Sheu et al. | ............ | 428/687 |
| 5,537,851 A | 7/1996 | Sheu et al. | ............ | 72/366.2 |
| 5,626,776 A | 5/1997 | Morris, Jr. | ............ | 219/121.64 |
| 6,844,522 B1 * | 1/2005 | Wang et al. | ......... | 219/121.64 |

OTHER PUBLICATIONS

Haynes, Gardber and Jha, Bijendra. "Joining Aluminum to Steel with Transition Material". *SAE Technical Paper Series*. 1999-01-0660. Warrendale, PA: SAE International. 1999.
Hector, Louis G. Jr. and Sheu, Simon. "Focused Energy Beam Work Roll Surface Texturing Science and Technology". *Journal of Materials Processing and Manufacturing Science*. vol. 2, 1062-0656/93/01. pp. 63-117. Technomic Publishing Co., Inc.: Jul. 1993.
Sheu, Simon, Hector, Louis G. Jr., and Richmond, Owen. "Tool Surface Morphologies for Friction and Wear Control in Metalworking Processes," *Journal of Tribolog*. vol. 120, pp. 517-527. ASME: Jul. 1998.

* cited by examiner

*Primary Examiner*—Len Tran

(57) ABSTRACT

An article suitable for metallurgical bonding having a first part having a lower surface, and a second part having an upper surface is disclosed. The lower surface of the first part is disposed at the upper surface of the second part to provide for a faying surface thereat. The faying surface has a plurality of channels having a depth equal to or greater than about 1 micron and equal to or less than about 1000 microns. The article is suitable for metallurgical bonding at the faying surface.

23 Claims, 5 Drawing Sheets

METHOD OF METALLURGICALLY BONDING ARTICLES AND ARTICLE THEREFOR

BACKGROUND OF THE INVENTION

The present disclosure relates generally to a method of metallurgically bonding an article and an article suitable therefor, and particularly to a surface condition at the article for improving the metallurgical bond.

Vehicle fabrication and assembly may involve a number of metallurgical bonds, such as welds for example, that may be time consuming to create and may require special considerations depending on the materials being bonded. The welding of galvanized parts, or galvanized to aluminum parts, may offer a challenge to the weld practitioner since zinc vapor from the coated steel, and magnesium vapor from magnesium-bearing aluminum alloys, is released at the weld site due to the high vapor pressures or low melting points of the respective materials. As a result, the entrapped vapors may introduce contaminants and/or voids within the solidified weld nugget.

Also of consideration to the weld practitioner may be the thickness of the parts being metallurgically bonded. For example, ultra-thin gage steel, having a thickness on the order of about 0.7 millimeters for example, may be difficult to resistance weld due to the large heat loss at the faying surface to the copper electrodes. The heat build-up at the electrodes tends to cause electrode material softening and facilitates the inter-diffusion between the electrode material and the zinc-rich coating on a galvanized steel surface, which in turn may accelerate electrode wear. As the electrode wears and the cap face flattens, the current density at the electrode-to-sheet interface decreases, resulting in a decrease in weld nugget size in the absence of compensating adjustments. One compensating adjustment may be to dress the electrode face as the electrode starts to wear, which may be time consuming and may be disruptive to high volume production processes.

Another consideration to the weld practitioner may be the use of hydroformed parts, which tend to have thin shells and may experience weld distortion and cracking at the weld site due to the high electrode force and the high weld temperatures required to produce a satisfactory weld.

Accordingly, there is a need in the art of metallurgical bonding methods and arrangements that overcome these drawbacks.

SUMMARY OF THE INVENTION

Embodiments of the invention disclose an article suitable for metallurgical bonding having a first part having a lower surface, and a second part having an upper surface. The lower surface of the first part is disposed at the upper surface of the second part to provide for a faying surface thereat. The faying surface has a plurality of channels having a depth equal to or greater than about 1 micron and equal to or less than about 1000 microns. The article is suitable for metallurgical bonding at the faying surface.

Further embodiments of the invention disclose a method of metallurgically bonding an article by resistance welding. A first part having a lower surface is placed against a second part having an upper surface to provide for a faying surface at an interface of the lower and the upper surface. The faying surface has a plurality of channels having a depth equal to or greater than about 1 micron and equal to or less than about 1000 microns. The first and the second parts are pressed against one another, and an electrical current is passed across the interface of the lower and the upper surfaces to result in metallurgical melting at the interface and capillary fluid flow of the metallurgical molten material within the plurality of channels. The faying surface is cooled thereby producing a metallurgical bond at the faying surface of the article.

BRIEF DESCRIPTION OF THE DRAWINGS

Referring to the exemplary drawings wherein like elements are numbered alike in the accompanying Figures.

DETAILED DESCRIPTION OF THE INVENTION

Embodiments of the invention provide an article having a first part and a second part that is suitable for metallurgical bonding, and a method for metallurgically bonding the article. In particular, the first part may be a door panel of an automobile and the second part may be a support structure of the automobile to which the door panel is bonded. The first part may be made from coated metal, such as galvanized steel for example, and the second part may be made from steel, aluminum, or any other material suitable for metallurgical bonding. The second part may also be made using a hydroforming process. The metallurgical bond may be accomplished using resistance welding, arc welding, laser welding, or any other process suitable for producing a metallurgical bond at a faying surface, such as electron beam welding or hybrid laser welding for example. As used herein, the term faying surface refers to the bonded region where a first surface of the first part interfaces with a second surface of the second part. Grooves, or channels, formed in the article at the faying surface prior to welding provide a means for venting vaporized particles and or gases at the weld site during welding to diminish the occurrence of voids in the resultant weld, and for providing capillary action at the weld site to broaden the footprint of the resultant solidified weld and constrict heat flow through the initial contact points between the first and second parts. The capillary action within the channels is a result of the capillary pressure between molten fluid and the wetted metal, which builds up to pull the molten metal outward from the weld center whereby both the first and second parts form a metallurgical bond. The channels, or micro-channels as they are also herein referred to, also serve as routes for the molten metal to flow outward away from the welding center, the outward flow being a result of the higher pressures at the welding center versus the surrounding regions.

Figure 1:
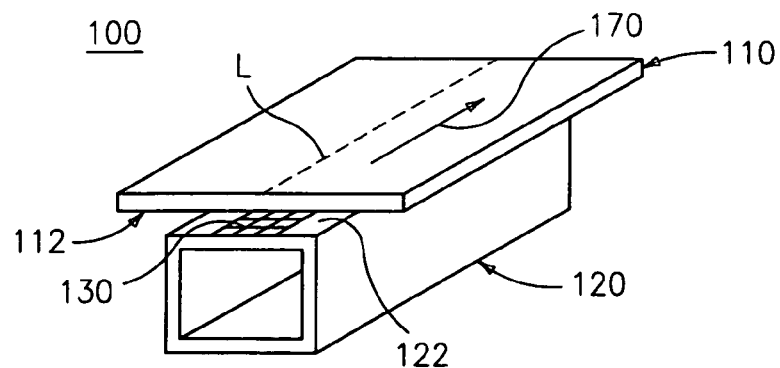
FIG. 1 depicts an exemplary article suitable for welding in accordance with embodiments of the invention.

FIG. 1 depicts an exemplary article 100 having a first part 110 with a lower surface 112 and a second part 120 with an upper surface 122. As discussed previously, first part 110 may be a door panel for example, and second part 120 may be a support structure for example. During metallurgical bonding of first part 110 to second part 120, lower surface 112 is disposed at upper surface 122 thereby providing for a faying surface between the two. The faying surface includes a plurality of channels 130 that are formed in upper surface 122 by laser or electron beam micro-machining, embossing, machining, rolling, scribing, or any other suitable method for producing micro-channels, such as knurling for example. In an embodiment, channels 130 have a nominal depth "d" equal to or greater than about 1 micron (or micro-meter, μm) and equal to or less than about 1000 microns, and a nominal width "c" equal to or greater than about 10 microns and equal to or less than about 1000 microns. In an alternative embodiment, "d" is equal to or less than about 200 microns, and "c" is equal to or less than about 100 microns. Due to their small dimensions, channels 130 are also referred to as micro-channels. Embodiments described herein depict channels 130 on upper surface 122, however, channels 130 may be on lower surface 112 or on both upper and lower surfaces 122, 112. In an embodiment having a plurality of channels 130 on both upper and lower surfaces 122, 112, the two sets of channels may be arranged orthogonal to each other.

Figure 2:
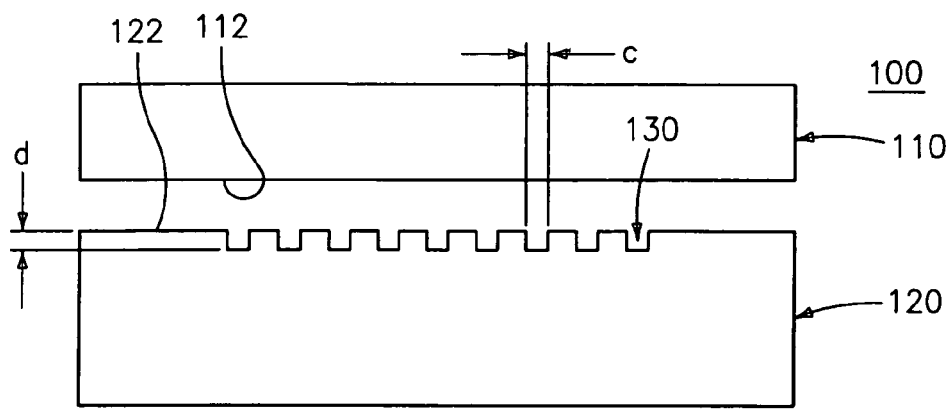
FIG. 2 depicts a partial end view of the article of FIG. 1.
Figure 3:
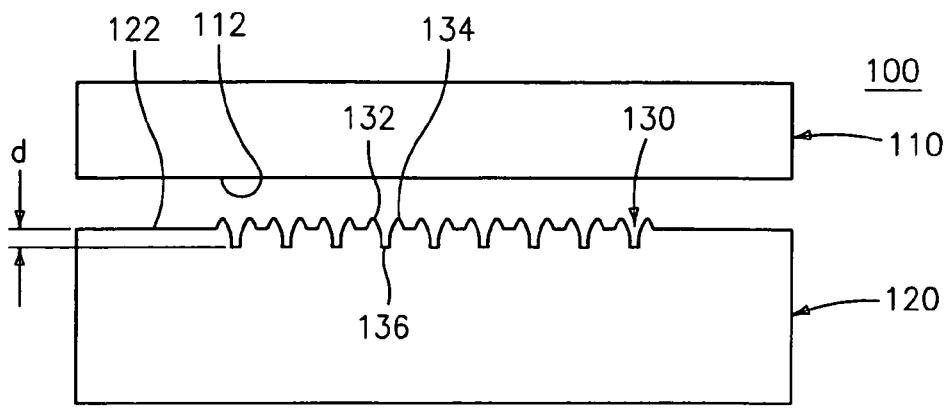
FIG. 3 depicts an alternative partial end view of the article of FIG. 1.

FIGS. 2 and 3 illustrate two different partial end views of article 100 of FIG. 1, with each Figure depicting channels 130 in an exaggerated scale and idealized cross-sectional geometry relative to the dimensions of second part 120. In FIGS. 2 and 3, only the top section of the rectangular hydroformed second part 120 is shown, the bottom and side sections being removed for clarity. In FIG. 2, channels 130 are formed such that upper surface 122 is planar, while in FIG. 3, channels 130 are formed such that upper surface 122 has ridges 132, 134 on either side of valley 136, which may be formed in a manner discussed previously. In different embodiments, ridges 132, 134 may be the same height relative to the floor of valley 136, or they may be of different heights. Ridges, or lips, 132, 134 may be formed in a snowplow-like manner using a mechanical instrument or a laser, where thermocapillary convection drives outward motion of the fluid from the evolving channel 130. The displaced material then solidifies along the banks of channels 130. As can be seen by reviewing the channels 130 of FIGS. 2 and 3, ridges 132, 134 (see FIG. 3) provide an extended surface area, or length in cross-sectional view, at the banks of channel 130, as compared to a channel 130 absent ridges 132, 134 (see FIG. 2). In an embodiment, ridges 132, 134 have a height relative to surface 122 that is equal to or less than the depth "d" of the corresponding channel 130. In an embodiment where the height of ridges 132, 134 is less than depth "d" of channel 130, the ridges 132, 134 may act as mechanical grippers during bonding, as well as acting to provide additional venting of gases and the like. Exemplary channels 130 and/or ridges 132, 134 have a directional topography associated with them, thereby enabling the venting discussed herein. The uniformity of channels 130 depicted in FIGS. 2 and 3 is for illustration purposes only, and channels 130 may be arranged in a variety of different ways, as depicted in FIGS. 4-8, which will now be discussed in further detail.

Figure 4:
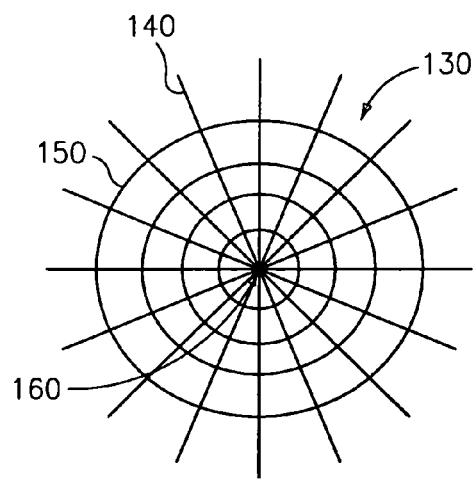
FIGS. 4-8 depict plan views of alternative patterns of channels for use in embodiments of the invention.

In FIG. 4, exemplary channels 130 include a first plurality of channels 140 and a second plurality of channels 150. In an embodiment, first plurality of channels 140 are straight lines that radiate from a center 160, and second plurality of channels 150 are concentric circles arranged about center 160. In an alternative embodiment, first plurality of channels 140 may be curvilinear, and second plurality of channels 150 may be arranged in other shapes, such as a polygon for example, where first and second channels 140, 150 are interconnected. The channel pattern 130 of FIG. 4 may be suitable for resistance welding where the upper and lower electrodes are aligned on center 160. However, to desensitize the quality of the weld to alignment considerations, alternative channel patterns may be preferable.

Figure 5:
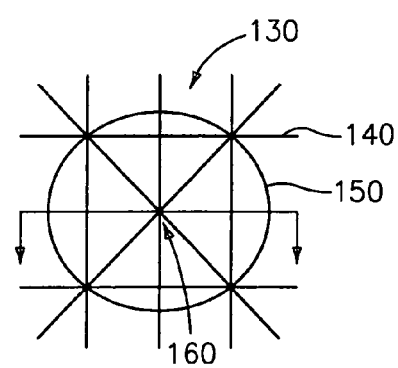
Figure 6:
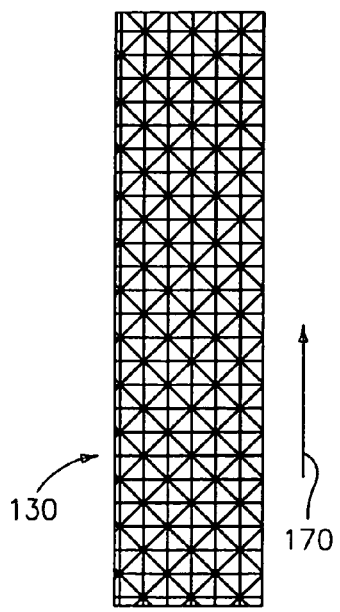

In FIG. 5, an alternative arrangement of channels 130 includes a first plurality of channels 140 having horizontal, vertical and diagonal lines, and a second plurality of channels 150 arranged in a circle about a center 160. While FIG. 5 depicts only one circular-channel 150, it will be appreciated that a repeat pattern of channels 130 will provide a plurality of circular channels 150 about different but similarly arranged centers 160. A repeat arrangement of channels 130, as depicted in FIG. 5, may be arranged in a strip, as depicted in FIG. 6. Referring to FIG. 6, channels 130 may be formed in upper surface 122 of second part 120 by a rolling process, where a rolling tool (not shown) has the channel pattern of FIG. 5 embossed on an outer surface of a roller in a repeating arrangement, and where the roller is rolled in the direction of arrow 170. Alternatively, a laser or electron beam device (not shown) may micro-machine the channels 130 into upper surface 122 while the laser head moves in the direction of arrow 170.

Figure 7:
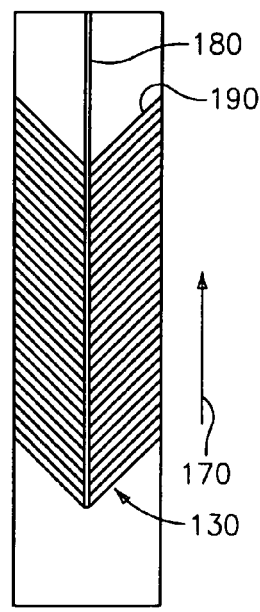

FIG. 7 depicts another strip arrangement of channels 130 that includes at least one linear channel 180 having a direction that is the same as the direction of a metallurgical bonding action, the direction being represented by arrow 170 and discussed in more detail later, and a plurality of rib-like channels 190 forming parallel lines on either side of the at least one channel 180, the channels 190 being slanted at an angle relative to the direction of the bonding action. In an embodiment, the plurality of rib-like channels 190 are slanted in a direction that is the same as the direction of the metallurgical bonding action 170.

Figure 8:
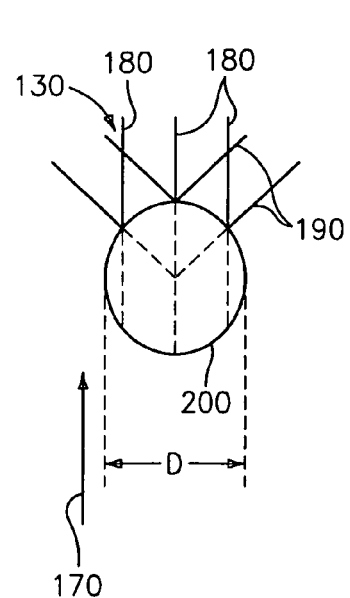

FIG. 8 depicts a similar arrangement to that of FIG. 7, but with multiple central linear channels 180, and with rib-like channels 190 that may vary in length as the pattern is repeated in the direction of arrow 170. The oval 200 in FIG. 8 represents an arc or laser weld bead having a diameter "D" that travels in the direction of arrow 170 during the welding process, which will be discussed in more detail later.

In viewing the channel patterns depicted in FIGS. 5, 6 and 8, it will be appreciated that weld bead 200 may not necessarily need to be aligned with a particular center 160, as discussed previously in relation to FIG. 4, since there are multiple channels 140, 180 running parallel to the direction of arrow 170 (direction of arc or laser welding), and multiple intersections (similar to centers 160) between a first plurality of channels 140, 180 and a second plurality of channels 150, 190.

Figure 10:
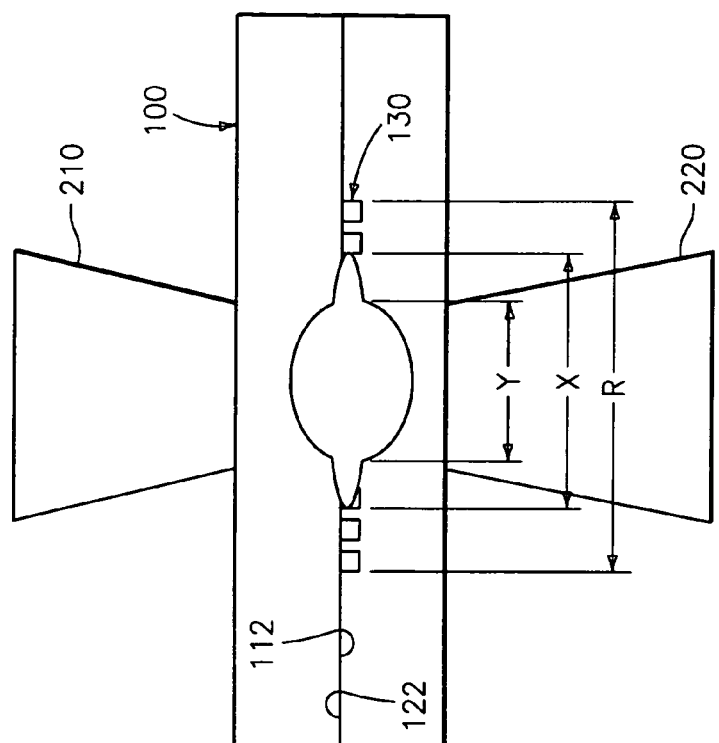
FIGS. 9-14 depict partial section views through the article of FIG. 1 with additional process features illustrated.
Figure 9:
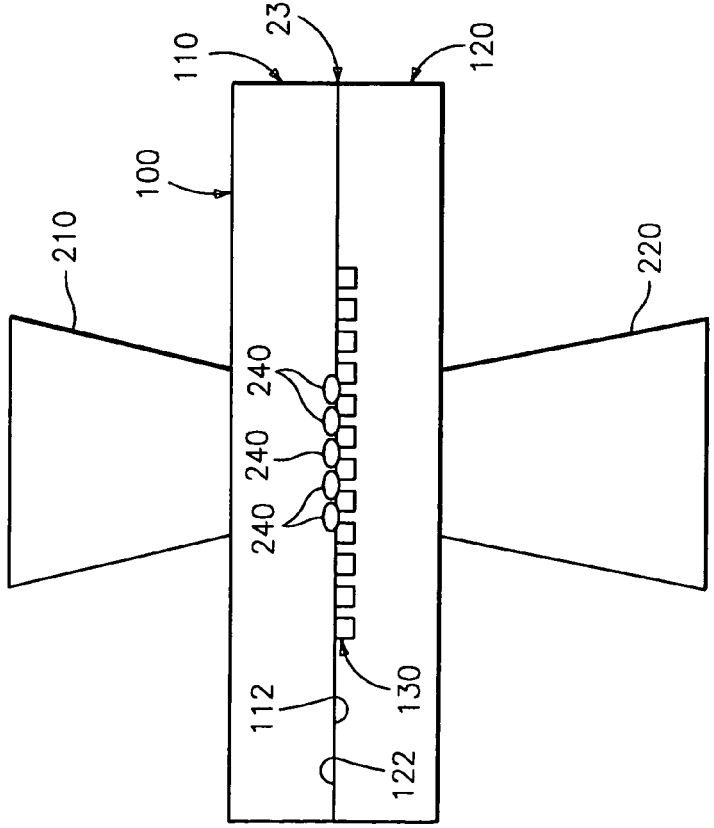

First with respect to resistance welding, and referring now to FIGS. 9 and 10 that depict a partial section view through an article 100 similar to that of FIG. 1 where the section plane is the plane of the paper and perpendicular to line "L", a method for resistance welding article 100 is depicted in illustration form. As discussed previously, article 100 includes a first part 110 and a second part 120, where second part 120 has a plurality of channels 130 disposed at an upper surface 122. Upper and lower electrodes 210, 220, respectively, are pressed against first and second parts 110, 120, thereby forcing first and second parts 110, 120 against one another. An electrical current, which may be alternating current (AC), direct current (DC) or pulsed current, passes between electrodes 210, 220 and across the interface 230 of the upper and lower surfaces 112, 122 to result in melting small amounts of surfaces 112 and 122 at the interface, and capillary fluid flow of the metallurgical molten material within the plurality of channels 130. FIG. 9 represents the beginning of the weld process, and FIG. 10 represents the end of the weld process. As depicted in FIG. 9, molten sites 240 are initiated along the ridge lines of channels 130 where lower surface 112 interfaces with upper surface 122. As the welding process continues, vaporized material, and particularly vaporized zinc from galvanized steel or vaporized aluminum or magnesium from a hydroformed part, vents away from the weld site via the plurality of channels 130, thereby reducing the occurrence of contaminants that may result in voids in the resultant solidified weld. Additionally, channels 130, as a result of their predetermined dimensions, provide a capillary action to force the molten material away from the center of the weld site, thereby broadening the cross-section of the resultant weld. Zinc coating on first and/or second parts 110, 120 has a lower boiling point temperature (about 906 degree-Celsius) than the underlying substrate, which in an embodiment may be steel for example, resulting in vaporized contaminants at the weld site that may be undesirable. The incorporation of appropriately dimensioned channels 130 aids in the removal of these contaminants for an improved resultant weld. Cooling of the faying surface produces a metallurgical bond at the faying surface having fewer voids than would be present in the absence of the plurality of channels 130, and where the overall dimension "X" of the resultant weld is greater than it would be in the absence of the plurality of channels 130, represented by dimension "Y". The difference between dimensions "X" and "Y" is attributed to the capillary forces at play during the welding process due to the presence of channels 130 and the pressure differences between pressed and non-pressed areas. In an embodiment, the overall dimension "R" of the plurality of channels 130 is greater than the overall dimension "X" of the resultant metallurgical bond, thereby maximizing the venting and capillary effect of channels 130.

Also, resistance welding with micro-channels 130 may be advantageous where first and/or second parts 110, 120 may be thin, such as equal to or less than about 1 millimeter (mm), or equal to or less than about 0.7 millimeter, since the resultant weld can be desensitized to electrode wear.

Figure 11:
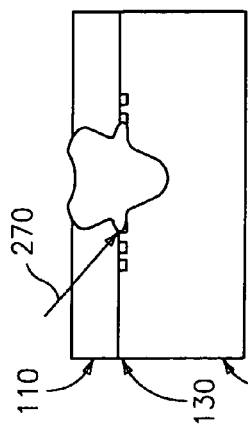
Figure 12:
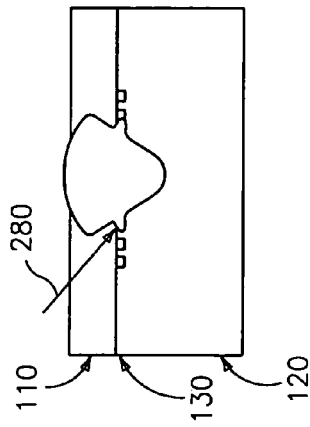
Figure 13:
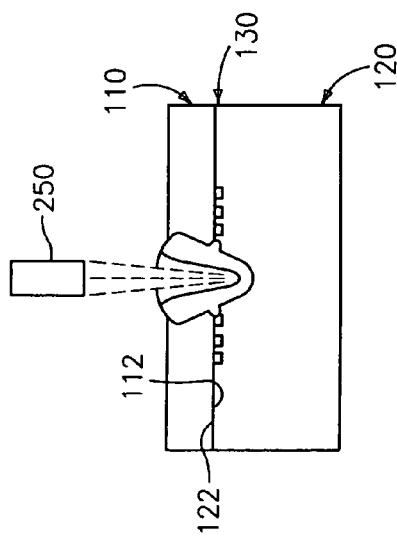
Figure 14:
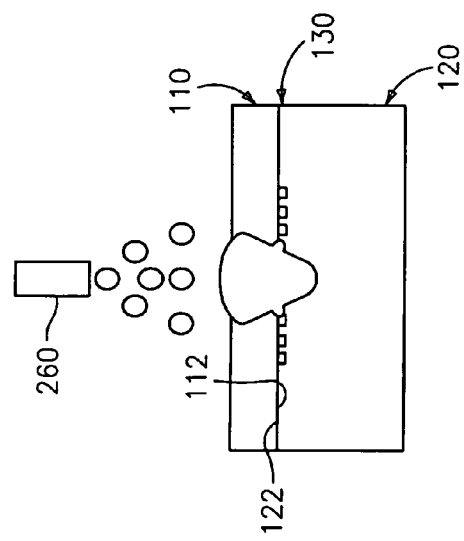

Reference is now made to FIGS. 11-14, which parallel the illustrations of FIGS. 9 and 10, except for illustrating different welding processes. FIGS. 11 and 12 depict laser welding at the initial stage (FIG. 11) and at the end stage (FIG. 12), while FIGS. 13 and 14 depict arc welding at the initial stage (FIG. 13) and at the end stage (FIG. 14). With both laser and arc welding, first and second parts 110, 120 are pressed against one another with a plurality of channels 130 being disposed on the upper surface 122 of second part 120, similar to the arrangement discussed previously. Heat is applied to first part 110 via a laser welding device 250 or an arc welding device 260 in such a manner that heat crossing the interface of lower and upper surfaces 112, 122 results in melting at the interface, venting of vaporized contaminants, such as zinc and/or magnesium vapor, away from the weld site via channels 130, and capillary fluid flow of the metallurgical molten material within the plurality of channels 130. Arrows 270, 280 point to the areas, illustrated as a sideways bulges, at channels 130 where venting and capillary action occurs. Laser and arc welding devices 250, 260 move along a path defined by line "L" (see FIG. 1) in a direction of arrow 170 (into the page when viewing FIGS. 11-14) to define a metallurgical bonding action. In an embodiment that metallurgically bonds article 100 via laser or arc welding, channels 130 may be made up of a repetitive pattern of channels similar to those depicted in FIGS. 5-8, and discussed previously. Laser and arc welding methods employed in the manner described herein may be suitable for bonding thin gage galvanized steel, having a thickness of equal to or less than about 1 millimeter, or equal to about 0.7 millimeter, to hydroformed support structures.

Figure 15:
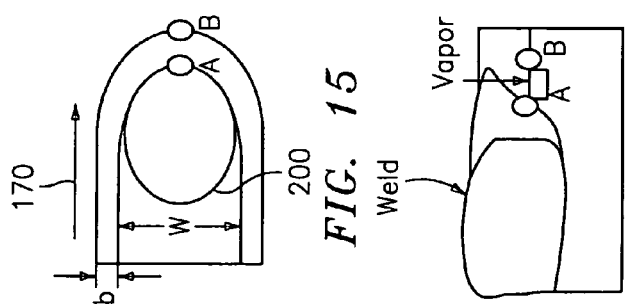
FIG. 15 depicts a plan view of a foot of a weld bead as it moves in a direction of welding and as used in embodiments of the invention.
Figure 16:
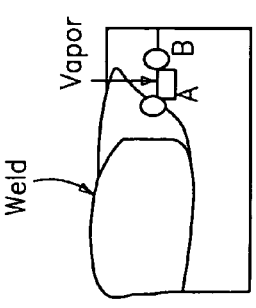
FIG. 16 depicts a side view of the weld bead of FIG. 15.
Figure 17:
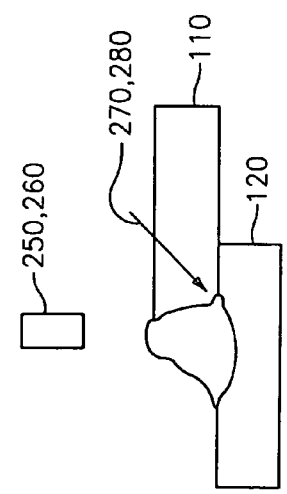
FIG. 17 depicts an end view of a weld made along an edge of an article in accordance with embodiments of the invention.

Referring now to FIGS. 15 and 16, where FIG. 15 depicts a plan view of the foot of weld bead 200 as it moves in the direction of arrow 170, the direction of welding, and FIG. 16 depicts a side view of FIG. 15. FIG. 16 is also representative of a side view of the welding action depicted in FIGS. 11 and 13. FIG. 17, having a view orientation similar to those of FIGS. 11 and 13 where movement of the welding device 250, 260 is into the plane of the paper, illustrates that a laser and an arc welding process may also be performed along an edge of first part 110. In FIG. 17, the region of channel venting and capillary action is depicted by arrow 270, 280.

In order to determine the size and quantity of channels 130 for effective vapor venting and capillary action, several calculations need to be performed (assuming a spatially constant pitch), which will now be described in more detail with reference to FIGS. 15 and 18.

Figure 18:
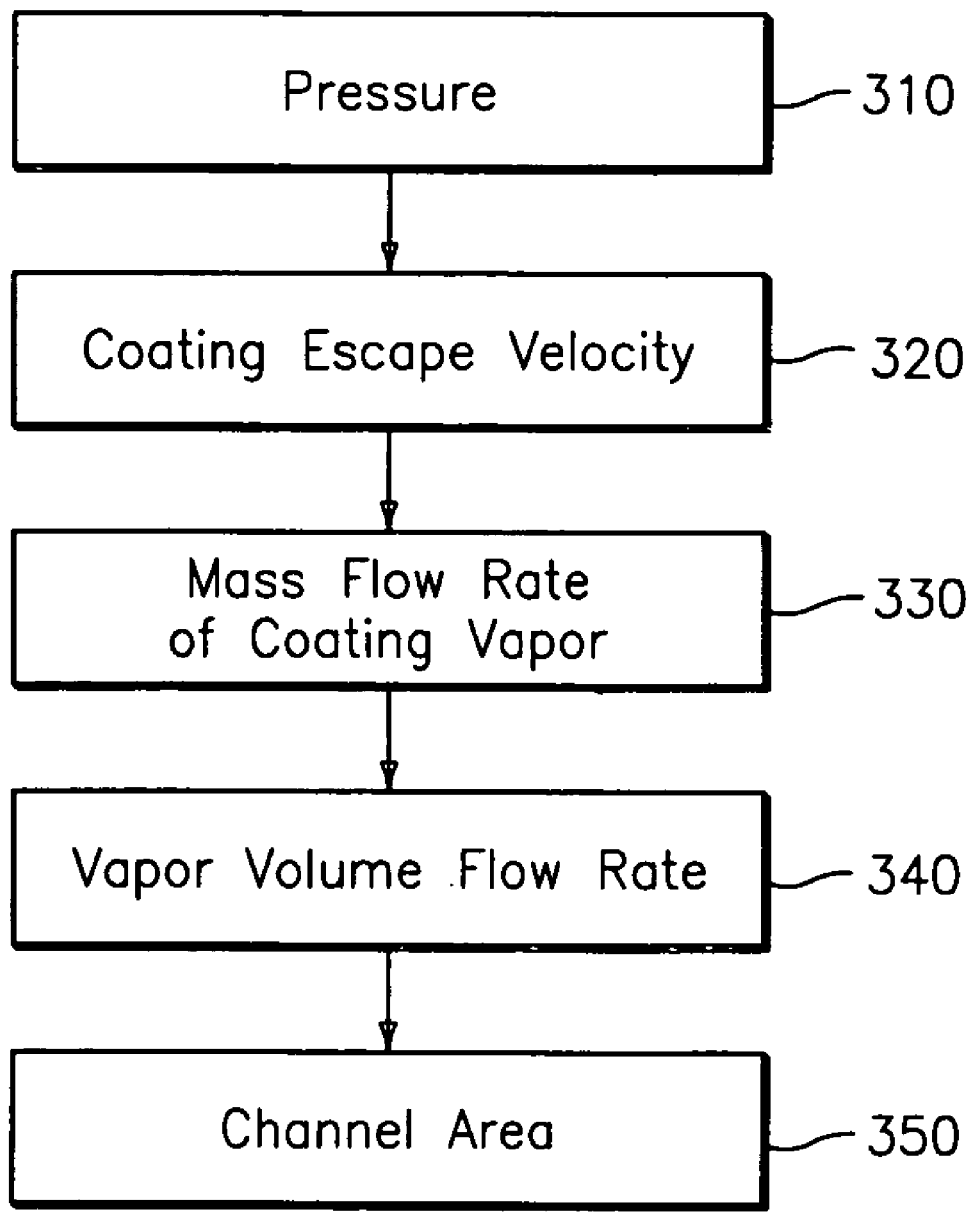
FIG. 18 depicts a flow chart of a method for use in accordance with embodiments of the invention.

FIG. 18 depicts a method 300 for calculating the size and quantity of channels 130 that begins at block 310 where the pressure $\Delta P_{AB}$ required to prevent the coating vapor from entering a weld pool during welding is estimated. See FIG. 15 for reference to location AB of $\Delta P_{AB}$. The equation for the pressure is given by Equation-1.

$$\Delta P_{AB} = \rho_{L,Fe} g\, T_p \qquad \text{Equa.-1}$$

where:
$\rho_{L,Fe}$ is the density of liquid iron
g is gravity
$T_p$ is the thickness of galvanized steel (first part).

At block 320, the escape velocity $V_B$ of the coating vapor is estimated. Using the Bernoulli equation, the equation for the velocity is given by Equation-2.

$$V_B = (2\Delta P_{AB}/\rho_{v,Co})^{0.5} \qquad \text{Equa.-2}$$

where:
$\rho_{v,Co}$ is the density of the coating vapor.

At block 330, the mass flow rate $\underline{m}$ of the coating vapor is estimated. The equation for the mass flow rate is given by Equation-3.

$$\underline{m} = 2T_{Co}V_w(W+2b)\rho_{s,Co} \qquad \text{Equa.-3}$$

where:
$T_{Co}$ is the thickness of the coating (Zinc for example)
$V_W$ is the welding speed
$\rho_{s,Co}$ is the density of solid coating (Zinc for example)
(W+2b) is depicted in FIG. 15, where W is the width of the weld, and b is the boiling width of the coating (Zinc for example).

At block 340, the volume flow rate $\underline{V}$ of the coating vapor is calculated. The equation for the volume flow rate is given by Equation-4.

$$\underline{V} = \underline{m}/\rho_{v,Co} \qquad \text{Equa.-4}$$

At block 350, the channel area and quantity of channels for venting the coating vapor away from the weld pool is calculated. However, these values are derived in the following manner.

If there is a total channel area A that allows the coating vapor to escape, then the volume flow rate $\underline{V}$ of the coating vapor is provided by Equation-5.

$$\underline{V}=V_B A. \qquad \text{Equa.-5}$$

Equating Equation-5 to Equation-4, substituting in Equation-3 for $\underline{m}$, and solving for area A with the conservation of the coating vapor being considered, gives:

$$A=(2T_{Co}V_W(W+2b)\rho_{s,Co})/(\rho_{v,Co}V_B). \qquad \text{Equa.-6}$$

Substituting Equations-1 and 2 into Equation-6, gives:

$$A=(2^{0.5}T_{Co}V_W(W+2b)\rho_{s,Co})/(\rho_{v,Co}\rho_{L,Fe}gT_p)^{0.5} \qquad \text{Equa.-7}$$

Further derivation assumes that the channel cross-section is rectangular, even though in practice the channel corners may be rounded. The channel cross-sectional dimensions are governed by the balance between molten fluid surface tension and the mean pressure from the molten fluid in the keyhole (a vapor cavity in the part being welded, caused by the welding device, that is filled in by the flow of molten fluid) that leads to imperfect wetting of the channels by the molten fluid. Imperfect wetting is desirable since it leads to slower heat extraction and minimal thermomechanical distortion and cracking without compromising mechanical interlocking between the solidified material and the channels. In view of these considerations, the channel width, c, is given by:

$$c=(4d((2\gamma/P)-d)))^{0.5} \qquad \text{Equa.-8}$$

where:
d is the channel depth
$\gamma$ is the surface tension of the molten metal in the keyhole
P is the mean fluid pressure.
The channel width, c, is related to the channel pitch, $\lambda$, by $$c=f\lambda \qquad \text{Equa.-9}$$

where the channel pitch is defined as the distance between the centers of adjacent channels, and:

$$0<f<1.$$

Assuming a channel length of $L_c$, then the total number of channels, $Q_c$, required is $$Q_c=A/(L_c c). \qquad \text{Equa.-10}$$

Exemplary values for variables presented in Equations 1-10 are as follows:
$\rho_{v,Co}$=21.87 kg/m$^3$ (kilogram/meter$^3$), (where the coating is Zinc)
$\rho_{s,Co}$=7135 kg/m$^3$, (where the coating is Zinc)
$\rho_{L,Fe}$=7320 kg/m$^3$
g=9.8 m/s$^2$ (meter/second$^2$)
$V_W$=1 m/min (meter/minute)
$T_{Co}$=9.81 μm
$T_p$=3 mm
W=3 mm
b=~0 (boiling width of zinc)
$\gamma$=2 N/m (Newton/meter), (where the metal is iron).

In an exemplary embodiment, article 100 includes rib-like channels 190 having a pitch $\lambda$ equal to or greater than about 7 millimeters and equal to or less than about 22 millimeters, more preferably, pitch $\lambda$ is equal to or greater than about 11 millimeters and equal to or less than about 13 millimeters, and even more preferably, pitch $\lambda$ is equal to about 12 millimeters.

In an exemplary embodiment having a channel width c of about 100 microns and a channel depth d of about 200 microns, about 7 channels are required for each piece of galvanized steel.

In another exemplary embodiment using resistance welding with a weld current of about 10.2 kilo-amps, an electrode weld force of about 480 pounds, and a weld time of about 14 cycles, it was observed that the weld diameter increased from about 5.1 millimeters to about 6.1 millimeters with the introduction of micro-channels in accordance with embodiments described herein.

As disclosed, some embodiments of the invention may include some of the following advantages: reduced number of voids at the weld site; increased foot print at the weld site that contributes a mechanical interlocking component to the overall bond; increased tensile strength at the weld site; ability to weld ultra thin gage steel; reduced need to redress electrode face as a result of electrode wear during resistance welding; the desensitization of spot welding on thin steel to variations in electrode diameter; reduced manufacturing cost and weight as a result of being able to weld with hydro-formed parts; reduced distortion at the weld site of the welded part; and, low equipment cost as a result of requiring only a single laser with laser welding.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items.

What is claimed is:

1. A method for metallurgically bonding an article by resistance welding, the method comprising:
    placing a first part having a lower surface against a second part having an upper surface to provide for a faying surface at an interface of the lower and the upper surfaces, the faying surface comprising a plurality of channels having a depth equal to or greater than about 1 micron and equal to or less than about 1000 microns;
    pressing the first and the second parts against one another;
    passing an electrical current across the interface of the lower and the upper surfaces to result in metallurgical melting at the interface and capillary fluid flow of the metallurgical molten material within the plurality of channels; and
    cooling the faying surface thereby producing a metallurgical bond at the faying surface of the article.

2. The method of claim 1, wherein:
    the first part comprises a substrate having a coating disposed at least at the lower surface of the substrate, the coating having a lower boiling point temperature than the substrate;
    in response to the passing of the electrical current across the interface, the coating at least partially vaporizes, and the vaporized material at least partially escapes away from the faying surface via the plurality of channels; and the cooling of the faying surface results in a metallurgical bond having fewer voids than would be present in the absence of the plurality of channels.

3. The method of claim 2, wherein the coating is zinc.

4. The method of claim 1, wherein at least one of the first part and the second part has a thickness equal to or less than about 1 millimeter.

5. The method of claim 4, wherein at least one of the first part and the second part has a thickness equal to or less than about 0.7 millimeter.

6. The method of claim 1, wherein the resulting metallurgical bond has an overall dimension greater than would be present in the absence of the plurality of channels.

7. The method of claim 1, further comprising: forming the plurality of channels in a surface of the faying surface.

8. The method of claim 7, wherein the forming comprises: forming the plurality of channels in the upper surface of the second part.

9. The method of claim 7, wherein the forming comprises: forming the plurality of channels to radiate from a center.

10. The method of claim 9, further comprising: forming a second plurality of channels arranged about the center.

11. The method of claim 10, further comprises: forming the second plurality of channels in a concentric pattern about the center.

12. The method of claim 11, wherein the concentric pattern comprises concentric circles.

13. The method of claim 7, wherein the forming comprises:
   forming the plurality of channels to have a width equal to or greater than about 10 microns and equal to or less than about 1000 microns.

14. The method of claim 7, wherein the forming comprises:
   forming the plurality of channels to have a depth equal to or less than about 200 microns, and to have a width equal to or less than about 100 microns.

15. The method of claim 7, wherein the forming comprises:
   forming the plurality of channels to have an overall dimension greater than an overall dimension of the resultant metallurgical bond.

16. The method of claim 7, wherein the forming comprises:
   forming a first ridge and a second ridge with a valley therebetween, wherein the first and second ridges have different peak heights relative to a floor of the valley.

17. The method of claim 1, further comprising:
   providing at least one of the first part and the second part with a thickness equal to or less than about 1 millimeter.

18. The method of claim 17, further comprising:
   depositing a coating on at least one surface of the faying surface, the coating having a lower boiling point temperature than the material upon which it is deposited.

19. The method of claim 18, wherein the providing and the depositing further comprises:
   providing at least one of the first part and the second part with a thickness equal to or less than about 0.7 millimeter; and
   depositing a zinc coating on at least one surface of the faying surface.

20. A method for metallurgically bonding an article, the method comprising:
   providing a first part and a second part, wherein at least one of a lower surface of the first part and an upper surface of the second part have a plurality of channels formed therein, the plurality of channels having a depth equal to or greater than about 1 micron and equal to or less than about 1000 microns;
   placing the lower surface of first part against the upper surface of the second part to provide for a faying surface at an interface of the lower and the upper surfaces, the faying surface comprising the plurality of channels;
   pressing the first and the second parts against one another;
   metallurgically bonding the first part to the second part at the faying surface in a manner to cause metallurgical melting at the interface and capillary fluid flow of metallurgical molten material within the plurality of channels; and
   cooling the faying surface thereby producing a metallurgical bond at the faying surface of the article.

21. The method of claim 20, wherein the metallurgically bonding comprises resistance-weld bonding, arc-weld bonding, or laser-weld bonding.

22. The method of claim 1, wherein:
   as a result of the capillary fluid flow within the plurality of channels, a footprint of the resultant metallurgical bond is broadened beyond an initial bond site region.

23. The method of claim 1, wherein:
   as a result of the capillary fluid flow within the plurality of channels, the plurality of channels become an integral part of the resultant metallurgical bond.

* * * * *